UNITED STATES PATENT OFFICE.

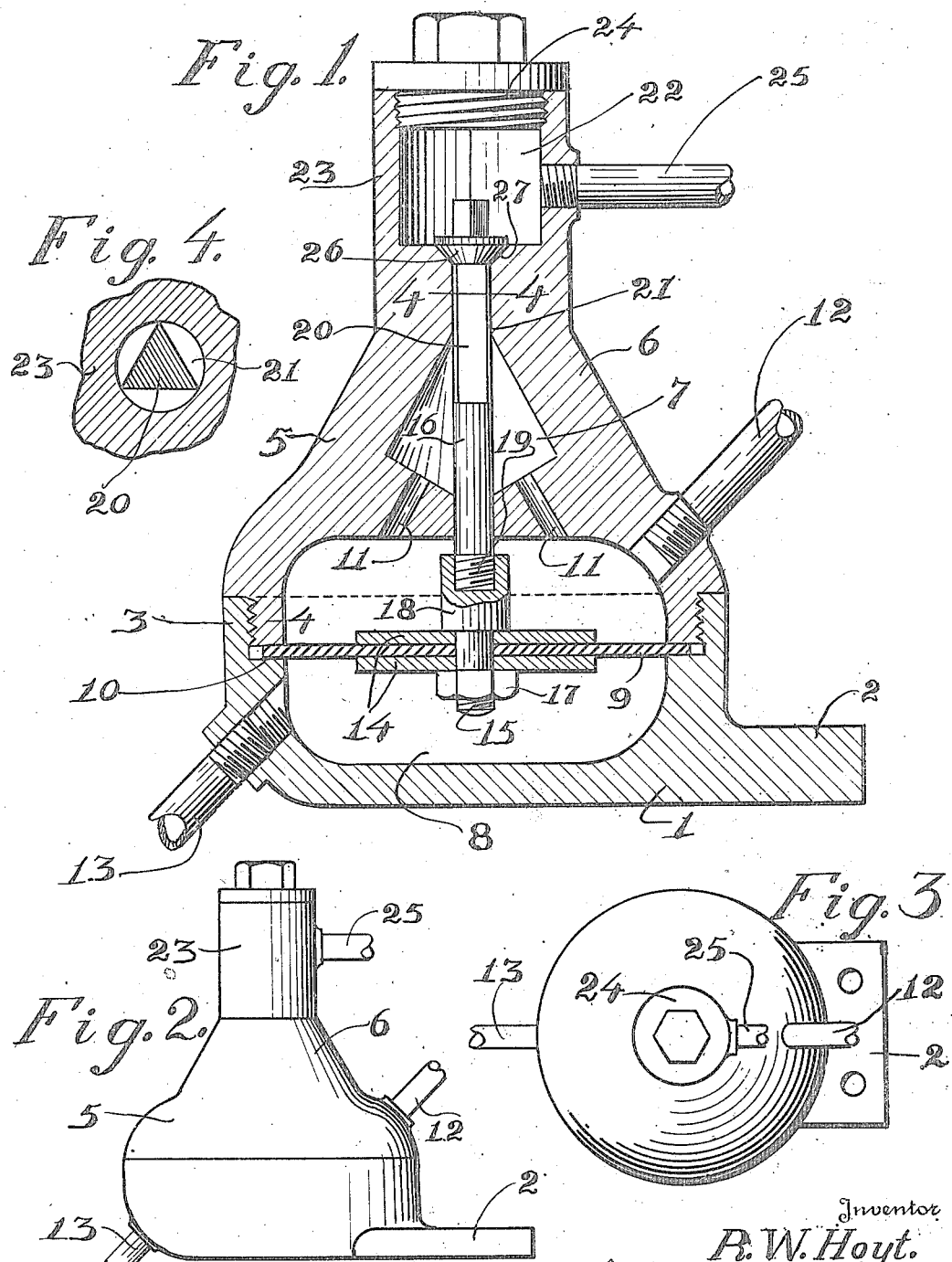
R. W. HOYT.
AUXILIARY AIR BRAKE FEED VALVE.
APPLICATION FILED OCT. 19, 1914.
1,181,010. Patented Apr. 25, 1916.

RUSSELL WARNER HOYT, OF FRANCES, WASHINGTON, ASSIGNOR OF ONE-HALF TO CHARLES B. HANDY, OF PORTLAND, OREGON.

AUXILIARY AIR-BRAKE FEED-VALVE.

1,181,010.  Specification of Letters Patent.  Patented Apr. 25, 1916.

Application filed October 19, 1914. Serial No. 867,527.

*To all whom it may concern:*

Be it known that I, RUSSELL WARNER HOYT, a citizen of the United States, residing at Frances, in the county of Pacific and State of Washington, have invented certain new and useful Improvements in Auxiliary Air-Brake Feed-Valves; and I do hereby declare the following to be a full, clear, and exact description of the invention, such as will enable others skilled in the art to which it appertains to make and use the same.

This invention comprehends certain new and useful improvements in auxiliary air brake feed valves for pneumatic brakes of cars and the like and has for its primary object to provide a valve of this character which will be constructed in such manner that the brake pipe leakage may be overcome.

The invention has for another object to provide a valve of this character which will be constructed in such manner that it may be readily assembled and connected with the proper parts of the system with which it is incorporated so as to operate automatically, the pressure from the equalizing reservoir serving to automatically open the valve upon a decrease of the pressure in the air brake pipe below a predetermined point.

The invention has for a further object to generally improve and simplify the construction and operation of valves of this character and increase the efficiency thereof without increasing the cost of the same and provide a valve which will be automatic in its operation and may be employed for various purposes and in the different air brake systems and the like.

With the above and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which—

Figure 1 is a longitudinal section through the complete valve. Fig. 2 is an elevation thereof. Fig. 3 is an end view, looking at the front end thereof, and Fig. 4 is a fragmentary detail cross section on the plane of line 4—4 of Fig. 1.

Referring more particularly to the drawings in which similar reference characters designate corresponding parts throughout the several views, 1 designates the back half of the body of the valve which has a bracket 2 extending therefrom, whereby the valve may be readily secured in proper position. It will be understood that the back half of the valve body is of substantially semi-spherical form and general outline, and has an interiorly threaded flange 3 projecting from its forward edge, within which is threaded the exteriorly threaded flange 4 projecting from the rear end of the front half 5 of the valve body. The forward portion of the front half 5 of the valve body is slightly tapered, as shown at 6 and an air chamber 7 is formed therein, the purpose of which will presently appear.

The air chamber 7 is connected with the main chamber 8 within which is positioned the diaphragm 9 having its edges secured between the flange 4 and the shoulder 10 formed by extending the flange 3 from the rear or back half 1 of the valve casing, thereby securely holding the diaphragm 9 in the center of the chamber 8. The air chamber 7 is connected with the air chamber 8 by means of the connecting passages 11 which diverge toward the chamber 8 from the chamber 7 or air compartment 7, as will be readily seen by referring to the drawing and air is conducted to the forward half of the air chamber 8 from the air chamber or compartment 7 by way of the passages 11 to press upon the forward side of the diaphragm 9 and to be fed from the forward half of the chamber 8 to the air brake applying mechanism, not shown, by way of the conducting pipe 12 leading from the forward half of the chamber 8.

The pressure upon the forward side of the diaphragm 9 is equalized by compressed air or other fluid conducted to the rear half of the air compartment 8 from an equalizing reservoir, not shown, by way of a conducting pipe 13 which communicates with the rear portion of the air chamber 8, as will be readily understood by referring to the drawings.

The diaphragm 9 has its central portion clamped between the plates 14 which are mounted upon the threaded rear portion 15 of the valve stem 16 which has a nut 17 mounted upon its rear end and bearing against one of the plates 14 while the opposite plate is pressed against the rear end of the collar 18, within which is threaded the rear end of the main section of the valve stem 16, as shown at 19. The valve stem 16 has a reduced triangular portion 20 which extends through a valve stem opening 21 in the forward half of the valve body and connects the air chamber or compartment 7 with the air chamber or compartment 22 formed in the extreme forward end 23 of the front half of the valve body and which has its forward end closed by a suitable plug 24 threaded therein.

An air conducting pipe 25 leading from the main air reservoir, not shown, connects with the air compartment or chamber 22 to supply the same with compressed air from the main reservoir so that upon leakage of the air from the brake pipe or pipe 12 leading to the brake applying mechanism and decreasing the amount of pressure against the forward side of the diaphragm 9, the air pressure from the equalizing tank directed through the pipe 13 to the rear portion of the chamber or air compartment 8 and against the rear side of the diaphragm, will overcome the pressure from the forward side thereof and force forwardly the valve stem 16, thereby moving the conical valve 26 formed on the forward end thereof away from the valve seat 27 at the forward end of the valve stem passage 21 to permit air from the compartment 22 to pass to the air compartment or chamber 8 and press upon the forward side of the diaphragm 9 and thereby again equalize the pressure upon the opposite sides of the diaphragm and return the same to normal position with the valve 26 again seated against the valve seat 27.

From the foregoing it will be readily seen that I have provided an automatic valve which will be especially adapted for use in air brake systems for trains and the like and that the valve will be automatic in operation. For example, should we have an engine carrying seventy pounds brake pipe pressure and ninety pounds main reservoir pressure and we should wish to make an application of the brake, say a ten pound application, we would draw off ten pounds, thereby reducing the equalizing reservoir pressure ten pounds and automatically reducing the brake pipe pressure the same amount. Now then, as there is always more or less leakage on all trains, especially freight trains, and particularly in northern countries where the air hose freeze easily, the longer we leave the brake valve on lap the harder the brake applies. With my valve in operation, it will hold the brake pipe pressure at the desired amount, or in this instance at sixty pounds. The chamber 8 being charged to sixty pounds, and at the instant of the closing of the brake pipe exhaust port in the brake valve chamber or forward portion of the chamber 8 is also charged to sixty pounds. Now any reduction in brake pipe pressure due to leakage will cause the pressure in the rear portion of the chamber 8 to force the diaphragm toward the forward portion of the chamber 8, opening the valve 26 and allowing main reservoir air to flow to the forward portion of the chamber 8 and the pipe 12 until the pressure in the forward portion of the chamber 8 and the rear portion thereof are equalized or practically equalized so that the diaphragm will return to normal position and again close the valve 26. It will be evident, however, that the movable parts will return to normal position just before the pressure on the opposite sides of the diaphragm 9 are equal, owing to the pressure in the chamber or compartment 22 upon the valve 26. This is desirable so that the valve 26 may again readily open when necessary and will also guard against the release of any of the brakes. This valve is especially desirable on trains which are compelled to travel upon a steep incline, as upon approaching the grade the brake valve may be thrown into full release and overcharge the brake pipe and then brought over to lap and the full amount of excess pressure pumped up without applying a brake.

It will be readily seen that I have provided a device to maintain the brake pipe pressure at a predetermined pressure, using the equalizing reservoir pressure as a basis.

While the preferred embodiment of the invention has been shown and illustrated, it will be understood that minor changes in the details of construction, and arrangement of parts may be made within the scope of the appended claims without departing from the spirit of the invention or sacrificing any of the advantages thereof.

What is claimed is:

1. A valve of the class described comprising a body formed of two members being substantially semi-elliptical in form, the upper portion of the top member being tapered and terminating into a cylindrical neck, a cap fitted in the end of said neck for closing the same, a valve seat formed between the neck and the tapered portion of said top member, a valve stem having a valve thereon slidably mounted through said tapered portion extending downwardly into the enlarged chamber formed by the two semi-elliptical members, a diaphragm mounted in said enlarged chamber of the semi-elliptical members and being secured to the lower end of the valve stem, means carried by said top and bottom member for forcing said valve up off the seat when in use.

2. A device of the class described comprising a pair of substantially semi-elliptical members forming an enlarged chamber interiorly thereof, the upper portion of the top member tapered and terminating in a cylindrical neck forming an intermediate and top chamber, each of said chambers provided with air passages communicating with one another, said top chamber provided with a valve seat, a valve stem slidably mounted through said seat and extending through the intermediate chamber into the enlarged chamber, a diaphragm securely held by the lower end of said stem, the outer edges of said diaphragm resting between the two semi-elliptical members, means for closing the upper cylindrical neck portion of said top member, a pipe connected to and communicating directly with said top chamber, a pipe connected to the top member and communicating directly with the interior of the enlarged chamber and a pipe connected to the bottom member and communicating directly with the enlarged chamber, a bracket secured to the bottom member for securing the same in position, said pipe adapted to control the air flow through said valve when in use.

In testimony whereof I affix my signature in presence of two witnesses.

RUSSELL WARNER HOYT.

Witnesses:
  C. B. Handy,
  P. O. Oliver.